US006795293B2

United States Patent
Timonov et al.

(10) Patent No.: US 6,795,293 B2
(45) Date of Patent: Sep. 21, 2004

(54) POLYMER-MODIFIED ELECTRODE FOR ENERGY STORAGE DEVICES AND ELECTROCHEMICAL SUPERCAPACITOR BASED ON SAID POLYMER-MODIFIED ELECTRODE

(75) Inventors: Alexander Timonov, Saint Petersburg (RU); Sergey Logvinov, Saint Petersburg (RU); Nikolay Shkolnik, West Hartford, CT (US); Sam Kogan, Newton Center, MA (US)

(73) Assignee: EnGen Group, Inc., Boston, MA (US)

( * ) Notice: Subject to any disclaimer, the term of this patent is extended or adjusted under 35 U.S.C. 154(b) by 0 days.

(21) Appl. No.: 10/350,167

(22) Filed: Jan. 23, 2003

(65) Prior Publication Data

US 2004/0057191 A1 Mar. 25, 2004

Related U.S. Application Data

(60) Provisional application No. 60/351,681, filed on Jan. 25, 2002.

(51) Int. Cl.[7] .............................................. H01G 4/005
(52) U.S. Cl. ...................... 361/303; 361/305; 361/502; 361/504; 361/508; 361/512; 429/194; 429/213; 252/62.2
(58) Field of Search ................................ 361/305, 303, 361/308, 502, 504, 508, 510–512, 516, 523–524, 528; 429/188, 194, 213; 525/62.2

(56) References Cited

U.S. PATENT DOCUMENTS

| 4,543,306 | A | * | 9/1985 | Dubois et al. ............... 429/337 |
| 5,424,151 | A | * | 6/1995 | Koksbang et al. ........... 429/213 |
| 5,527,640 | A | | 6/1996 | Rudge et al. |
| 5,729,427 | A | | 3/1998 | Li et al. |
| 5,840,443 | A | | 11/1998 | Gregg et al. |
| 5,948,562 | A | | 9/1999 | Fulcher et al. |
| 5,968,745 | A | * | 10/1999 | Thorp et al. .................... 435/6 |
| 6,120,696 | A | * | 9/2000 | Armand et al. ............. 252/62.2 |
| 6,254,797 | B1 | * | 7/2001 | Michot et al. .............. 252/62.2 |
| 6,383,363 | B2 | | 5/2002 | Jow et al. |

* cited by examiner

Primary Examiner—Dean A. Reichard
Assistant Examiner—Nguyen T. Ha
(74) Attorney, Agent, or Firm—Houston Eliseeva LLP

(57) ABSTRACT

An energy storage device, such as a battery or supercapacitor, that includes at least two electrodes, at least one of the electrodes includes an electrically conducting substrate having a layer of energy accumulating redox polymer complex compound of transition metal having at least two different degrees of oxidation, which polymer complex compound is formed of stacked transition metal complex monomers. The stacked transition metal complex monomers have a planar structure with the deviation from the plane of no greater than 0.1 nm and a branched system of conjugated $\pi$-bonds. The polymer complex compound of transition metal can be formed as a polymer metal complex with substituted tetra-dentate Schiff's base. The layer thickness of redox polymer is within the range 1 nm–20 $\mu$m.

23 Claims, 5 Drawing Sheets a)

b)

POLYMER-MODIFIED ELECTRODE FOR ENERGY STORAGE DEVICES AND ELECTROCHEMICAL SUPERCAPACITOR BASED ON SAID POLYMER-MODIFIED ELECTRODE

RELATED APPLICATIONS

Priority is claimed to U.S. Provisional Patent Application Ser. No. 60/351,681 filed Jan. 25, 2002.

FIELD OF THE INVENTION

The present invention relates to electrical energy storage devices such as advanced supercapacitors and batteries and, more specifically, to such devices that use polymer modified electrodes.

BACKGROUND OF THE INVENTION

Secondary current sources (storage batteries) make it possible to accumulate, store and give up electric power to an external electric circuit. Among these are conventional batteries, conventional capacitors and electrochemical capacitors (also called Supercapacitors or Ultracapacitors)—[B. E. Conway, *Electrochemical Supercapacitors*// Kluwer Acad. Plen. Publ., NY, 1999, 698 p.].

A conventional electrochemical supercapacitor usually includes a hermetically sealed housing filled with electrolyte, a positive electrode (anode) and negative electrode (cathode) placed inside said housing, a separator that separates anode space from cathode space and special lead terminals connecting the supercapacitor to external electric circuits.

Electrochemical supercapacitors are based on the capacitive (not battery type) or Faradic (battery type) method for storing electric power. In the capacitive type supercapacitors, the capacity of the double electric layer formed at the electrolyte/electrode boundary is used for accumulating energy. Carbon materials having a large specific surface are usually employed as the electrode in such supercapacitors. No chemical or phase changes take place on the electrode surface or in the electrode space during the charge/discharge process in such a device.

In Faraday type supercapacitors, the charge/discharge process is accompanied by redox reactions on the electrode surfaces. In contrast to conventional batteries, these processes take place in a thin layer of electrically active substance on the electrode surface. The surface of electrodes in many known supercapacitors of this type is covered with metal oxides.

Both above mechanisms of energy accumulation exist in known energy storage devices, which are usually classified by the mechanism that makes the major contribution to the energy accumulation and storage process. Electrochemical supercapacitors have very high specific power (as high as 10 kW/kg) and long service life (up to 1 million charge/discharge cycles). These features open a wide range of potential applications for electrochemical supercapacitors [Supercapacitor Market Survey, World Markets, Technologies & Opportunities: 1999–2004 Technical-Economic Analysis for 2000, Tyra T. Buczkowski, ISBN#1-893211-05-32].

Nevertheless, known electrochemical supercapacitors are not free from disadvantages. In particular, they have low specific energy capacity. The value of specific energy capacity for commercially available electrochemical supercapacitors lies within the relatively low range of 1–10 W·h/kg.

The highest value of specific energy capacity was claimed for electrochemical supercapacitors of Faradic type that include carbon electrodes with ruthenium oxide on their surface. It is around 30 W·h/kg [U.S. Pat. No. 6,383,363]. However, high cost of ruthenium would impede the wide application of such devices.

The maximum values of specific energy capacity of known supercapacitors are limited primarily by the nature of materials used for electrode manufacture—i.e. metal oxides. Metal oxides require supplement of conductive additives, which increase the weight of the system and, therefore, reduce the specific energy capacity. These materials also contribute to the high cost of these devices.

Several attempts have been made to obtain fundamentally new materials and technologies for the design and manufacture of electrochemical supercapacitors. These attempts include chemical modification of electrodes—for example, by immobilizing conducting polymers on the inert electrode surface.

Conducting polymers are subdivided into two groups [B. E. Conway, Electrochemical Supercapacitors// Kluwer Acad. Plen. Publ., NY, 1999, 698 p]:

1) The so-called "organic metals" or conducting polymers—these are polymers with a conduction mechanism similar to that of metals;
2) Redox polymers—i.e. compounds in which electron transfer is effected mainly due to redox reactions between adjacent fragments of polymer chain.

Polyacetylene, polypyrrole, polythiophene and polyaniline represent examples of "organic metals". In partially oxidized form, these polymers offer an even greater degree of conduction, and they can be considered as salts consisting of positively charged "ions" of polymer and counter-ions evenly distributed over its structure (these counter-ions support the overall electrical neutrality of a system).

The polaron theory of conduction is acknowledged to be the main model of charge transfer in conducting polymers [Charge Transfer in Polymeric Systems //Faraday Discussions of the Chemical Society. 1989. V.88]. In solid state physics, a polaron is a cation radical which is partially delocalized over a polymer fragment. The polaron becomes stable, thus polarizing its environment. (#Paragraph 1)

"Organic metals" can be produced by electrochemical oxidation of appropriate monomers on an inert electrode surface. These polymers can be converted from a conducting state (i.e. oxidized state) into a non-conducting state (i.e. reduced state) through variation of the electrode potential. Transition of a polymer from the oxidized state into the neutral reduced state is accompanied by the egress of charge-compensating counter-ions from the polymer into the electrolyte solution, in which the process is conducted. The reverse is also possible.

Both purely organic systems and polymer metal complexes (i.e. metal organic compounds) fall into the category of redox polymers [H. G. Cassidy and K. A. Kun. Oxidation Reduction Polymer //Redox Polymers. Wiley—Interscience, New York, 1965]. Polymers containing metals are better conductors than those without.

As a rule, polymer metal complex compounds are produced via electrochemical polymerization of source monomer complex compounds with octahedral or square-planar configurations, wherein electrochemical polymerization being performed on inert electrodes. As will be shown below, the spatial configuration of monomers plays a crucial role in the formation of polymer structures suitable for use in supercapacitor. Polypyridine complexes of composition poly-[Me(v-bpy)$_x$(L)$_y$], where:

Me=Co, Fe, Ru, Os;

v-bpy=4-vinyl-4'-methyl-2,2'-bipyridine;

L=v-bpy (4-vinyl-4'-methyl-2,2'-bipyridine), phenanthroline-5,6-dione, 4-methyl phenanthroline, 5-aminophenanthroline, 5-chlorophenanthroline; (x+y=3) represent an example of redox polymers formed using octahedral source complex compounds [Hurrel H. C., Abruna H. D. Redox Conduction in Electropolymerized Films of Transition Metal Complexes of Os, Ru, Fe, and Co //Inorganic Chemistry. 1990. V.29. P.736–741].

Metal ions that may be in different states of charge represent redox centers—i.e. atoms participating in redox reactions in a polymer. Metal complexes having only one possible state of charge (zinc, cadmium) do not produce redox polymers. Conduction of redox polymers requires the presence of a branched system of conjugated Π-bonds that serve as conducting "bridges" between redox centers in a ligand environment of complexes. When a redox polymer is completely oxidized or completely reduced (i.e. all its redox centers are in one state of charge), charge transfer along the polymer chain is impossible and redox polymer conduction is close to zero. When redox centers are in different states of charge, exchange of electrons is possible between them (this proceeds in the same manner as in solution in the course of redox reactions). Therefore, conduction of redox polymers is proportional to the constant of electron self-exchange between redox centers ($k_{co}$) and to concentrations of oxidized [Ox] and reduced [Red] centers in a polymer. In other words, the redox polymer conduction is ~$k_{co}$[Ox] [Red].

Conduction of redox polymers is maximum when the concentration of oxidized redox centers is the same as the concentration of reduced redox centers, which corresponds to the redox system having a standard redox potential $E^o$([Ox]/[Red]). Because redox centers of polymers, which are based on coordination compounds, may be in different states of charge these redox polymers are called "mixed-valence complexes" or "partially oxidized complexes".

Transition of redox polymer molecules from the oxidized state to the reduced state is accompanied (as has been described for conducting polymers) by the egress of charge-compensating counter-ions from a polymer into the electrolyte solution, in which the process is conducted, and vice versa.

There are known electrochemical supercapacitors with electrodes modified by "organic metals" (conducting polymers)—[B. E. Conway, Electrochemical Supercapacitors// Kluwer Acad. Plen. Publ., NY, 1999, 698 p.]. Application of "organic metals" in electrochemical supercapacitors has demonstrated a number of essential advantages offered by these materials over other systems—in particular, over metal oxides:

1. The polymers possess intrinsic conduction, which makes it unnecessary to use dispersion current supply matrices;
2. Polymer materials are at least one order of magnitude cheaper than the majority of oxide materials used in supercapacitors;
3. Formation of conducting polymer materials can be carried out directly on the electrode surface without using a number of intermediate synthetic steps;
4. Conducting polymer materials enable one to create supercapacitors of both known types—capacitive supercapacitors or "double-layer" supercapacitors (based on the charge/discharge processes of a double layer of electrodes) and "pseudo-capacitive" supercapacitors or "Faradic" supercapacitors (based on the oxidation/reduction processes of an electrically active substance immobilized on the electrodes);
5. Although inferior to oxide materials in terms of stability, polymers nevertheless make it possible to create energy-storage systems with a long service life (up to $10^5$–$10^6$ cycles).

There are three types of polymer-based supercapacitors [B. E. Conway, Electrochemical Supercapacitors //Kluwer Acad. Plen. Publ., NY, 1999, 698 p; U.S. Pat. No. 5,527,640].

Type I: both electrodes are made of one and the same polymer. When in a completely charged state, one electrode is oxidized completely, while another electrode is in the uncharged (neutral) state. In this case, the potential difference is usually 0.8–1.0 V. As a result of discharge, the final voltage of the supercapacitor, as a rule, is no greater than half of the indicated value—i.e. 0.4–0.5 V [B. E. Conway, supra, p.319].

Such a change in voltage between the electrodes (to a half of the difference of potentials in the beginning of discharge cycle) of supercapacitor is characteristic for systems in which the capacity is determined by the capacity of the double layer of electrodes (so-called "double-layer supercapacitors").

Type II: in principle, supercapacitors of this type are similar to those of type I. However, polymers having different redox potentials are used in the supercapacitors of this type in order to increase the difference of potentials [B. E. Conway, supra, p.320].

Type III: one electrode is made of the oxidized form of a polymer, while the other electrode is made of a reduced form of the same polymer [B. E. Conway, supra, pp.320–321]. Supercapacitors of Type III offer the highest values of voltage (up to 3 V when using non-aqueous solvents), and, hence, the highest specific energy capacity. Supercapacitors of Type III are considered to be the most promising electrochemical supercapacitor systems.

According to B. E. Conway, supercapacitors based on conducting polymers with the metallic type of conduction may be considered as "double-layer" systems, accumulating energy due to charging of the polymer surface and compensation for the acquired charge by counter-ions that are present in the electrolyte. The specific energy capacity of such systems is mainly determined by the degree of development of conductive substrate surface; as a rule, it is not high. Conway [B. E. Conway, supra, p.321] gives the following values of specific energy accumulated by polymers for the three types of polymer-based supercapacitors (see Table below):

TABLE

Characteristics of Different Types of Supercapacitors Based on Conducting Polymers

| Supercapacitor type | Voltage, V | Specific energy capacity of the polymer | |
| --- | --- | --- | --- |
| | | J/g of polymer weight | W · h/kg of polymer weight |
| I | 1.0 | 41 | 11 |
| II | 1.5 | 100 | 27 |
| III | 3.1 | 140 | 39 |

As can be seen from this table, specific energy capacity of Type III electrochemical supercapacitors with electrodes modified by an "organic metal" (conducting polymer), is higher than that of supercapacitors with electrodes with metal oxides on their surface. However, the difference is not large.

As compared to electrodes modified by "organic metals" (conducting polymers), redox polymers and electrodes with redox polymers on their surface potentially offer higher specific energy capacity owing to the greater contribution of the Faradic component of capacity to the overall capacity of the polymer, which is associated with multi-electron oxidation/reduction of metal centers.

Nevertheless, improving supercapacitor design and performance, especially as it concerns the increase in specific energy, still remains very important problem.

Further details on prior known elements, processes, and devices related to the field of the present invention can be further understood from the following references:

1. U.S. Pat. No. 5,729,427
2. U.S. Pat. No. 6,383,363
3. U.S. Pat. No. 5,840,443
4. B. E. Conway supra p. 319, 320, 321
5. P. Audebert, P. Capdevielle, M. Maumy. Redox and Conducting Polymers based on Salen Type Metal Units; Electrochemical Study and Some Characteristics// New J. Chem. 1992. V. 16 P. 697

SUMMARY OF THE INVENTION

It is an object of the present invention to produce an energy-storage device—e.g., an electrochemical supercapacitor—having electrodes modified by redox polymer complex compound of transition metal formed of stacked transition metal complex monomers.

Design of electrodes represents a principal feature of the electrochemical capacitor according to the present invention, where at least one of the electrodes includes a polymer-modified conductive surface, where the polymer comprises stacked transition metal complex monomers.

It is a further object of the present invention to provide an electrochemical supercapacitor with higher specific energy capacity than known and reported prior devices.

One exemplary electrochemical capacitor, according to the principles of the present invention, includes a polymer-modified electrode having a conductive substrate, on which a layer of energy-accumulating redox polymer is applied, with said redox polymer being a stack-type polymer complex compound of a transition metal, which has at least two degrees of oxidation. The stack-type polymer complex compound is comprised of monomer fragments of planar structure having a branched system of Π-bonds. Preferably, the deviation from a plane is no greater than 0.1 nm. The thickness of energy-accumulating redox polymer layer is preferably from 1 nm to 20 µm. The polymer complex compound may take a number of forms, examples of which appear in the detailed description below.

The set of features according to the invention disclosed herein provides for the creation of a highly effective supercapacitor due to the application of the electrode chemically modified by a redox polymer—polymer metal complex with substituted tetra-dentate Schiff's base. This results in a dramatic increase in the specific energy capacity of a supercapacitor over known supercapacitors. The possibility of creating electrochemical supercapacitors of Type III offering the highest energy capacity represents very important issue. The polymer used for electrode according to the present invention is capable of making a transition both into the oxidized state and reduced state. In other words, the polymer is capable of operating both on a positive electrode and negative electrode enabling the potential of one example of an electrochemical electrode to go as high as 3 V and the value of the specific energy capacity of the polymer to be above 300 J/g.

A feature of the electrode, according to the principals of the present invention, for energy storage devices includes a new combination of a layer of energy accumulating redox polymer on the conductive substrate of the electrode, with said redox polymer being a stack-type polymer complex compound of a transition metal that has at least two degrees of oxidation, which is comprised of monomer fragments of planar structure with preferably a deviation from a plane of no greater than 0.1 nm and having a branched system of Π-bonds.

BRIEF DESCRIPTION OF THE DRAWINGS

Other benefits and objects of the present invention shall become apparent with the following detailed description of embodiments when taken in view of the appended drawings, in which.

DETAILED DESCRIPTION OF EXEMPLARY EMBODIMENT OF THE INVENTION

Figure 1:
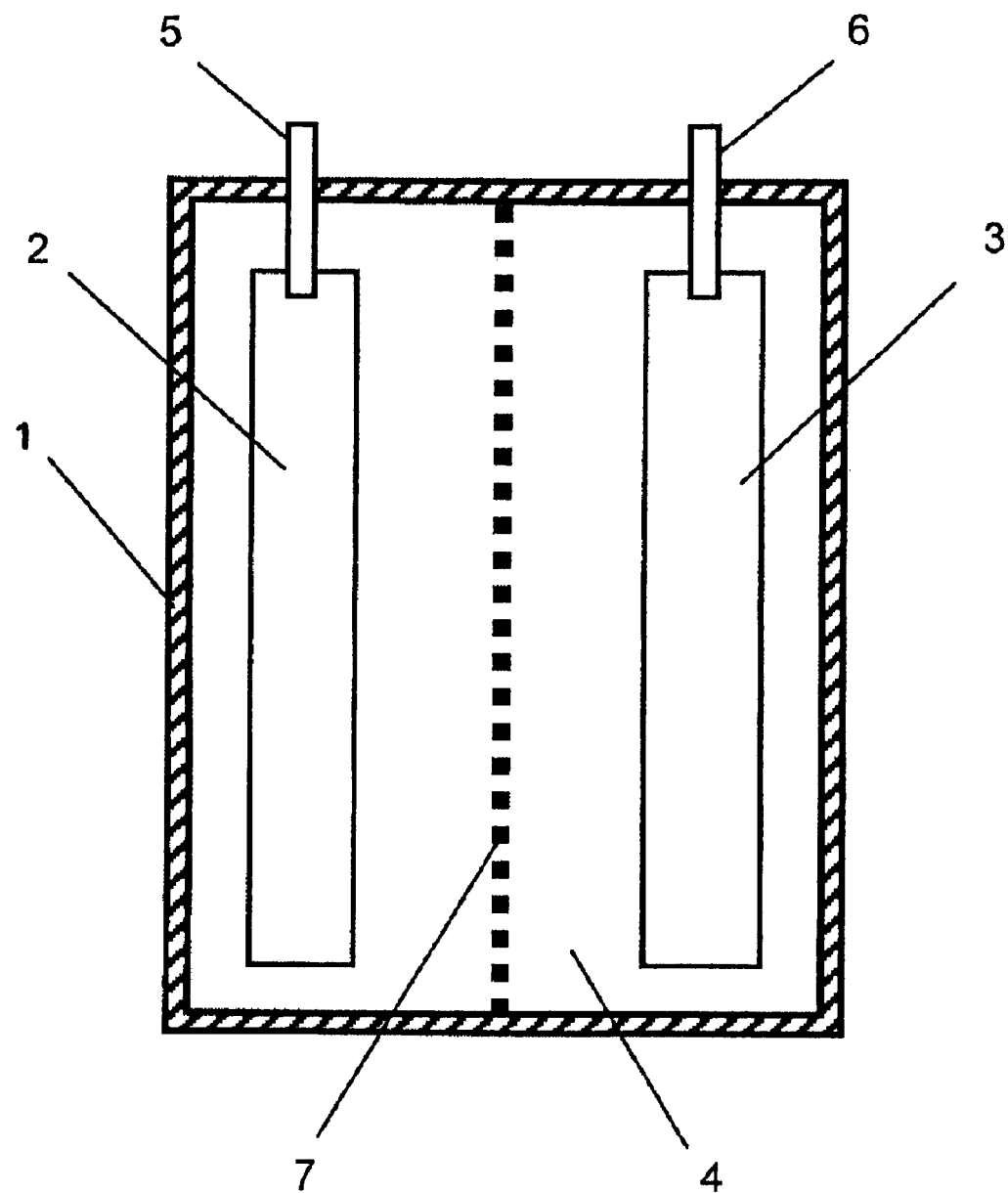
FIG. 1 is a schematic of an exemplary energy storage device, e.g. an electrochemical supercapacitor, configured in accordance with the principles of the present invention. Although only one cell is shown, it will be understood that additional cells can be combined in the actual device.

An example of specific implementation of the invention is shown in FIG. 1 as an electrochemical supercapacitor employing polymer poly-[Ni(CH$_3$O-Salen)] as an energy-accumulating substance.

The supercapacitor includes casing 1; electrodes 2, 3; electrolyte 4; electrode terminals 5, 6; and separator 7. In this example, each electrode is formed of chemically modified platinum with a layer of redox polymer poly-[Ni(CH₃O-Salen)] (1 μm thick) applied onto it, with said redox polymer being produced by oxidational polymerization of monomer of N,N'-ethylene-bis(3-methoxysalicylidene-iminato) nickel (II) of square-planar structure.

Other embodiment may include one electrode modified with a layer of energy accumulating redox polymer on electrically conducting substrate, while the other electrode being just an electrically conducting substrate, the said electrically conducting substrate being any suitable conventional electrode.

An electronically conductive material having large specific surface area is used as the conductive substrate for electrode 2, 3. For example, among such materials are carbon fiber and other carbon materials with a large specific surface area, carbon materials with metal coatings, and metal electrodes with large specific surface. Electronic conduction polymers in the form of films, porous structures, foams and so forth can also be used. The material can have flat surface or developed surface with large specific surface area, such carbon felt or equivalent.

Substances soluble in organic solvents to a concentration of no less than 0.01 mol/l and containing ions that are electrochemically inactive at potentials of −3.0 to +1.5 V (from here on the values of potentials are given in relation to the chlorine-silver reference electrode), with said ions having the diameter no greater than 0.6 nm, are used as electrolyte. Salts of tetrabutylammonium, or tetramethylammonium, or tetraethyl ammonium—perchlorates, tetrafluoroborates, hexaflurophosphates and other substances, which produce ions of the appropriate size and degree of mobility when dissolved, are suitable examples for use in the present invention.

Acetonitrile, dimethyl ketone, propylene carbonate and other organic solvents can be used as solvent.

Additional substances raising the service life and enhancing the reliability and stability of properties and other parameters may be added to electrolyte composition. Thickeners that transform electrolyte into a gel-like state to improve operation abilities can be used.

Figure 2:
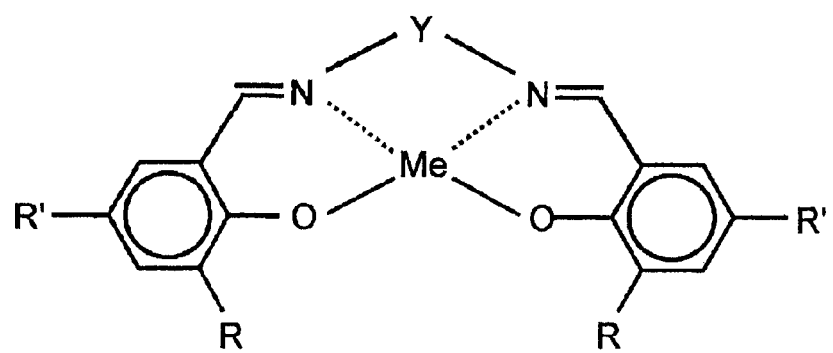
FIG. 2 shows examples of monomer fragments of polymer metal complex that can be formed on the surface of one or both electrodes of FIG. 1.

Monomer fragments of polymer metal complex of electrodes 2 and 3 of FIG. 1 are shown in FIG. 2, where Me=Ni, Pd, Co, Cu, Fe.

For Y of structure

the following can be used as R and R':

R=OC₂H₅, R'=H, monomer [Me(C₂H₅O-Salphen)], or N,N'-phenylene-bis(3-ethoxysalicylidene-iminato) metal (II);

R=OCH₃, R'=H, monomer [Me(CH₃O— Salphen)], or N,N'-phenylene-bis(3-methoxysalicylidene-iminato) metal (II);

R=H, R'=Cl, monomer [Me(Cl— Salphen)], or N,N'-phenylene-bis(5-chlorosalicylidene-iminato) metal (II);

R=H, R'=Br, monomer [Me(Br— Salphen)], or N,N'-phenylene-bis(5-bromsalicylidene-iminato) metal (II);

R, R'=H, monomer [Me(SalEn)], or N,N'-phenylene-bis (salicylidene-iminato)metal (II).

For Y of structure

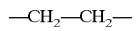

the following can be used as R and R':

R=OC₂H₅, R'=H, monomer [Me(C₂H₅O-SalEn)] or N,N'-ethylene-bis(3-ethoxysalicylidene-iminato)metal (II);

R=OCH₃, R'=H, monomer [Me(CH₃O-SalEn)] or N,N'-ethylene-bis(3-methoxysalicylidene-iminato)metal (II);

R=H, R'=Cl, monomer [Me(Cl-SalEn)] or N,N'-ethylene-bis(5-chlorosalicylidene-iminato) metal (II);

R=H, R'=Br, monomer [Me(Br-SalEn)], or N,N'-ethylene-bis(5-bromsalicylidene-iminato) metal (II).

R, R'=H, monomer [Me(SalEn)], or N,N'-ethylene-bis (salicylidene-iminato)metal (II).

For Y of structure

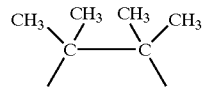

the following can be used as R and R':

R=OC₂H₅, R'=H, monomer [Me(C₂H₅O-Saltmen)], or N,N'-tetramethylethylene-bis(3-ethoxysalicylidene-iminato)metal (II);

R=OCH₃, R'=H, monomer [Me(CH₃O-Saltmen)] or N,N'-tetramethylethylene-bis(3-methoxysalicylidene-iminato)metal (II);

R=H, R'=Cl, monomer [Me(Cl-Saltmen)] or N,N'-tetramethylethylene-bis(5-chlorosalicylidene-iminato) metal (II);

R=H, R'=Br, monomer [Me(Br-Saltmen)] or N,N'-tetramethylethylene-bis(5-bromsalicylidene-iminato) metal (II);

R, R'=H, monomer [Me(Saltmen)] or N,N'-tetramethylethylene-bis (salicylidene-iminato)metal (II).

Polymer metal complexes with substituted tetra-dentate Schiff's bases can be used as said polymer complex compound of transition metal.

For example, a compound from a group poly-[Me(R, R'-Salen)], where: Me—transition metal;

Salen—residue of bis-(salicylaldehyde)-ethylenediamine in Schiff's base;

R=H or electron-donating substituent, for example CH₃O—, C₂H₅O—, HO— or —CH₃;

R'=H or Hlg, can be used as such polymer metal complex, and the structure of this compound will be as follows;

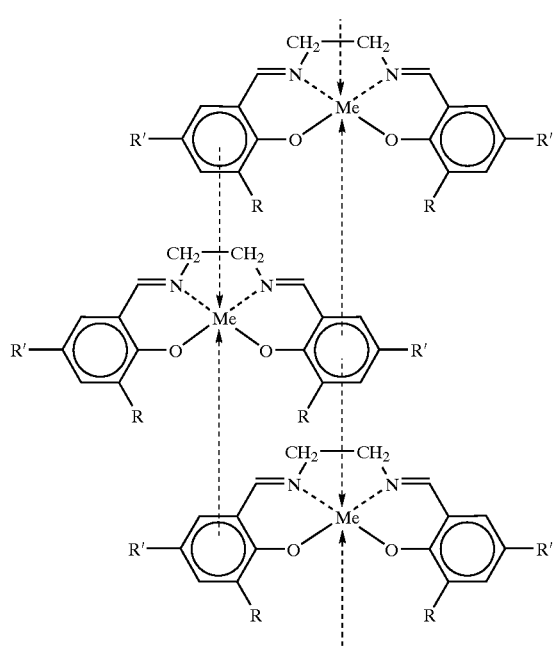

In a shortened form, it can be presented by the following graphical formula:

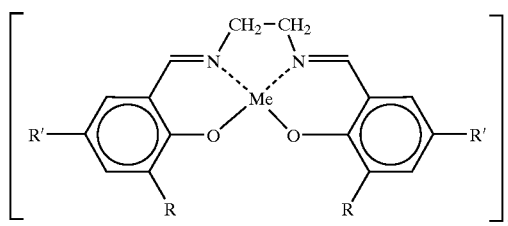

where n may take any value in the range from 2 to 200000.

Also, a compound from a group: poly-[Me(R, R'-Saltmen)], where: Me—transition metal; Saltmen—residue of bis(salicylaldehyde)-tetramethylethylenediamine in Schiff's base; R=H or electron-donating substituent, for example $CH_3O—$, $C_2H_5O—$, HO— or —$CH_3$; R'=H or Hlg, may be used as such polymer metal complex, and the structure of this compound will be as follows:

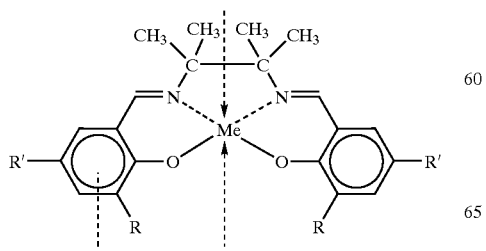

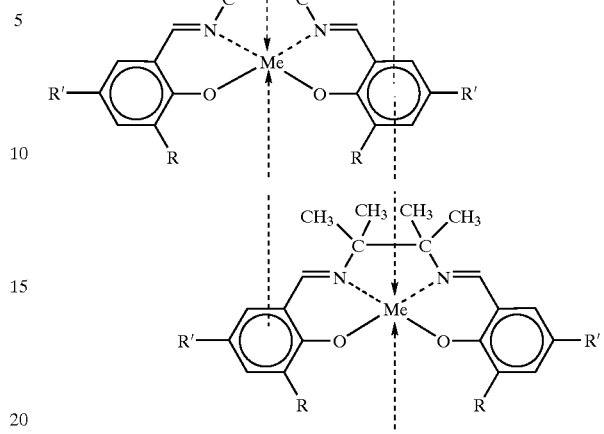

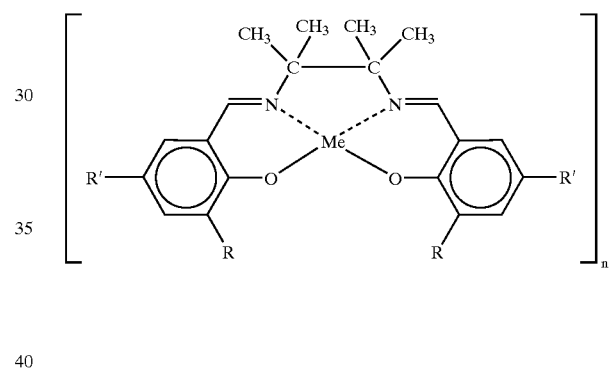

In a shortened form, it can be presented by the following graphical formula:

where n may take any value in the range from 2 to 200000.

Also, a compound from a group poly-[Me(R, R'-Salphen)], where: Me—transition metal; Salphen—residue of bis-(salicylaldehyde)-o-phenylenediamine in Schiff's base; R=H or electron-donating substituent, for example $CH_3O—$, $C_2H_5O—$, HO— or —$CH_3$; R'=H or Hlg; may be used as such polymer metal complex, and the structure of this compound will be as follows:

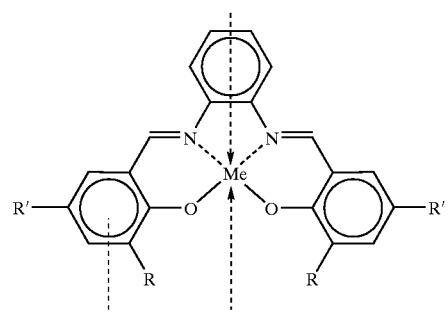

-continued

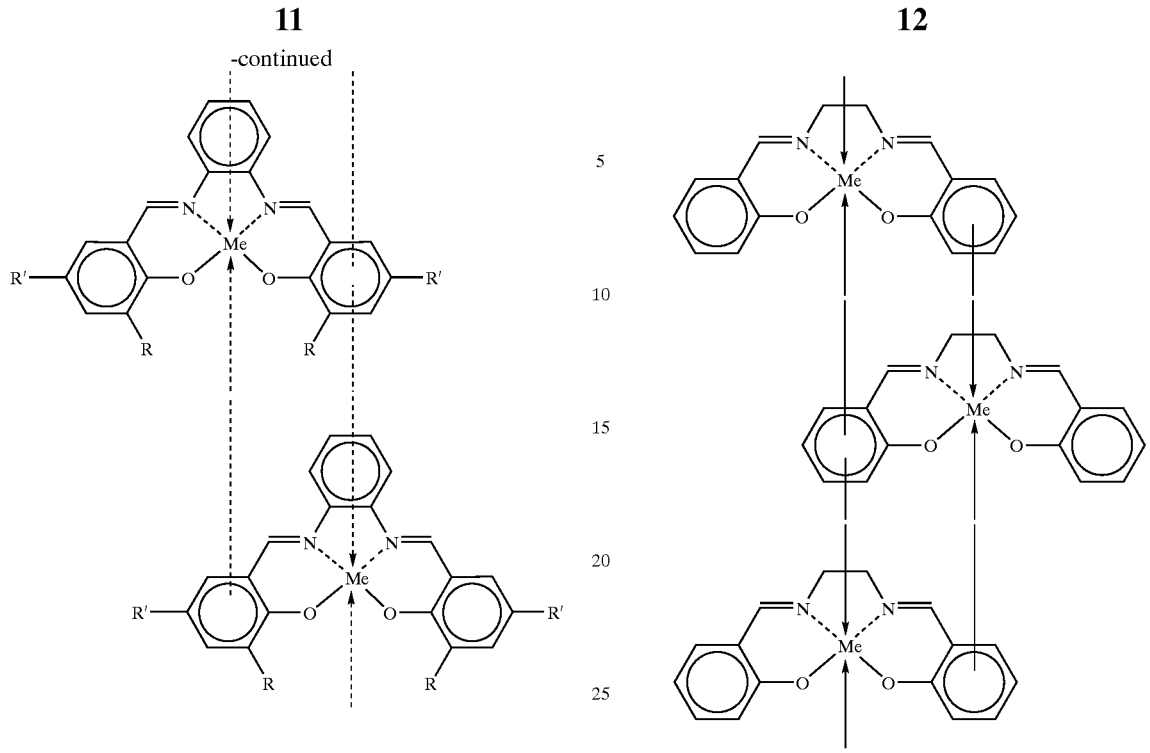

In a shortened form, it can be presented by the following graphical formula:

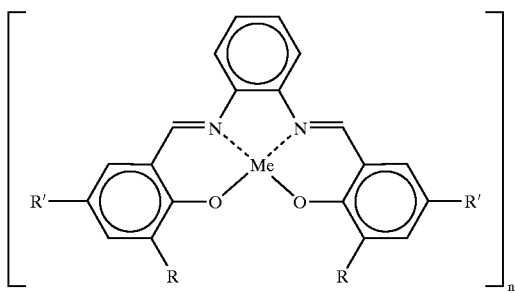

where n may take any value in the range from 2 to 200000.

Any metal from the group Ni, Pd, Co, Cu, Fe may be used as transition metal Me in the polymer complex compound.

Figure 3:
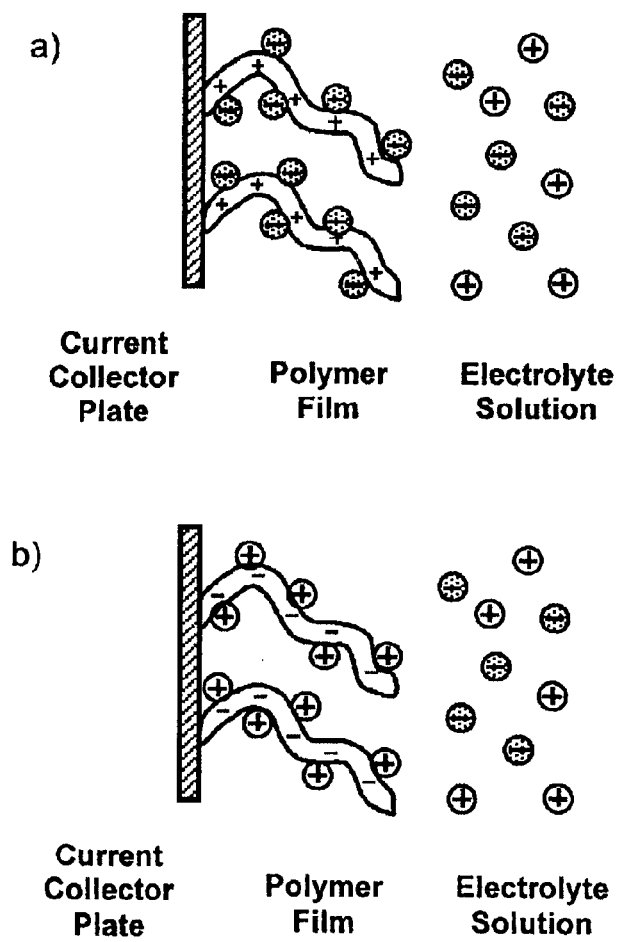
FIG. 3a is a pictorial representation of an electrode 2, 3 fragment with polymer metal complex in the oxidized state. Only the bases of the polymer elements are shown for simplicity.
FIG. 3b is similar to FIG. 3a showing an electrode 2, 3 fragment with polymer metal complex in the in the reduced state. Only the bases of the polymer elements are shown for simplicity.
Figure 5:
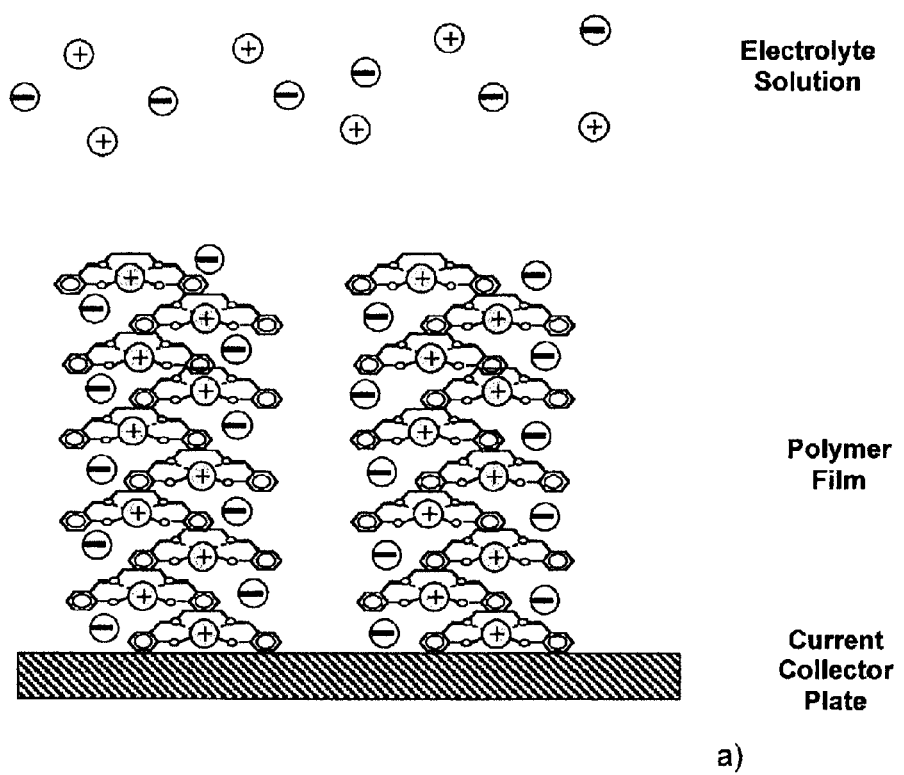
FIGS. 5a and 5b are one example of micro detail representations of the elements of FIGS. 3a and 3b, respectively.
Figure 5:
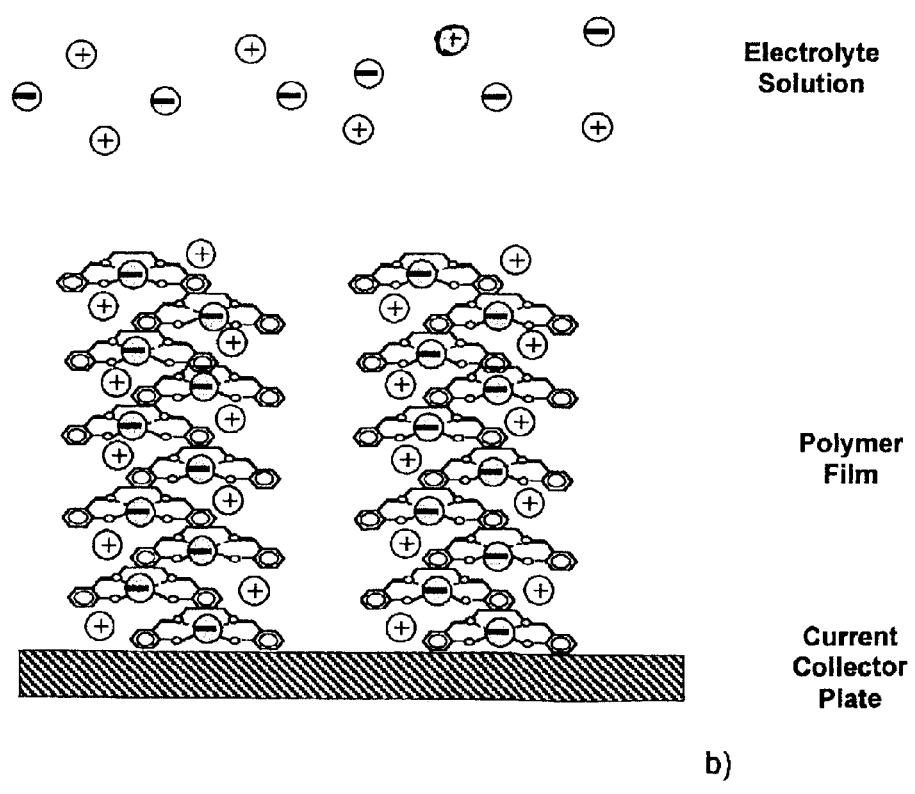
Figure 6:
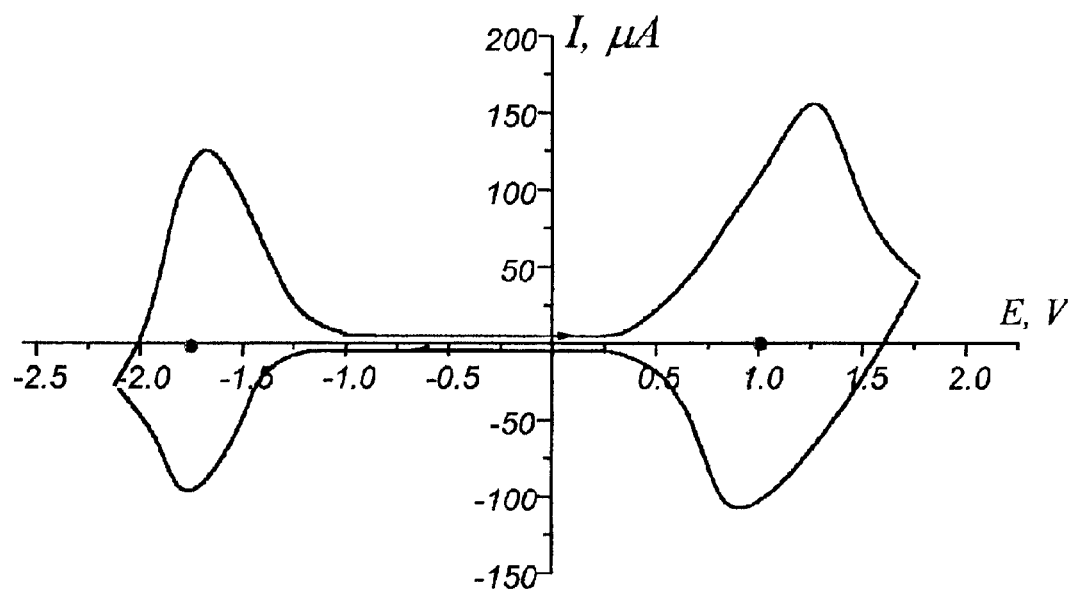
FIG. 6 is a graph showing one example a cyclic chrono-volt-amperegram of a redox processes in the polymer film of_complex poly-[Ni(CH$_3$O-Salen)] of FIGS. 3 and 5.

According to the principles of the present invention a redox polymer complex compound of transition metal is configured as "unidirectional" or "stack" macromolecules, generally as shown in FIGS. 3 and 5.

Representatives of the group of polymer metal suitable for the electrodes 2, 3 fall into the class of redox polymers, which provide novice anisotropic electronic redox conduction. For more detail on these polymer complexes, see Timonov A. M., Shagisultanova G. A., Popeko I. E. Polymeric Partially-Oxidized Complexes of Nickel, Palladium and Platinum with Schiff Bases//Workshop on Platinum Chemistry. Fundamental and Applied Aspects. Italy, Ferrara, 1991. P. 28.

Formation of bonds between fragments can be considered, in the first approximation, as a donor-acceptor intermolecular interaction between a ligand of one molecule and the metal center of another molecule. Formation of the so-called "unidimensional" or "stack" macromolecules takes place as a result of said interaction. Such a mechanism of the formation of "stack" structures of a polymer currently is best achieved when using monomers of square-planar spatial structure. Schematically this process can be presented as follows:

Superficially a set of such macromolecules looks to the unaided eye like a solid transparent film on an electrode surface. The color of this film may vary depending on the nature of metal and presence of substitutes in the ligand structure. But when magnified, the FIG. 3 stack structures become evident, see FIG. 5.

Polymer metal complexes are bonded with the interelectrode surface due to chemisorption.

Charge transfer in polymer metal complexes is effected due to "electron hopping" between metal centers with different states of charge. Charge transfer can be described mathematically with the aid of a diffusion model. Oxidation or reduction of polymer metal complexes, associated with the change in the states of charge of metal centers and with directed charge transfer over polymer chain, is accompanied, to maintain overall electrical neutrality of the system, by penetration into a polymer of charge-compensating counter-ions that are present in the electrolyte solution surrounding the polymer or by the egress of charge-compensating counter-ions from the polymer.

The existence of metal centers in different states of charge in a polymer metal complex is the reason for calling them "mixed-valence" complexes or "partially-oxidized" complexes.

The metal center in the exemplary polymer complex poly-[Ni(CH$_3$O-Salen)] may be in one of three states of charge:

$Ni^{2+}$—neutral state;

$Ni^{3+}$—oxidized state;

$Ni^{+}$—reduced state.

Figure 7:
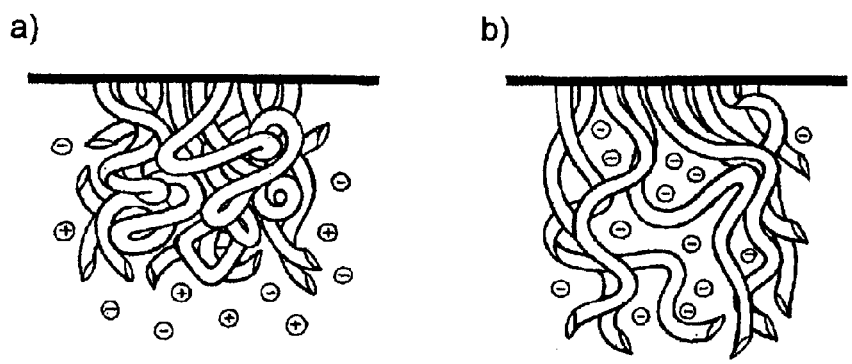
FIGS. 7a and 7b are similar to FIGS. 3a and 3b showing neutral (a) and oxidized (b) forms of polymers configured according to FIG. 5. More of the polymer elements are shown than in FIGS. 3a and 3b.

When this polymer is in the neutral state (FIG. 7*a*), its monomer fragments are not charged and the charge of the metal center is compensated by the charge of the ligand environment. When this polymer is in the oxidized state (FIG. 7*b*), its monomer fragments have a positive charge, and when it is in the reduced state, its monomer fragments have a negative charge. To neutralize spatial (volume) charge of a polymer when the latter is in the oxidized state, electrolyte anions are introduced into the polymer structure. When this polymer is in the reduced state, neutralization of the net charge results due to the introduction of cations (see FIG. 3).

Figure 4:
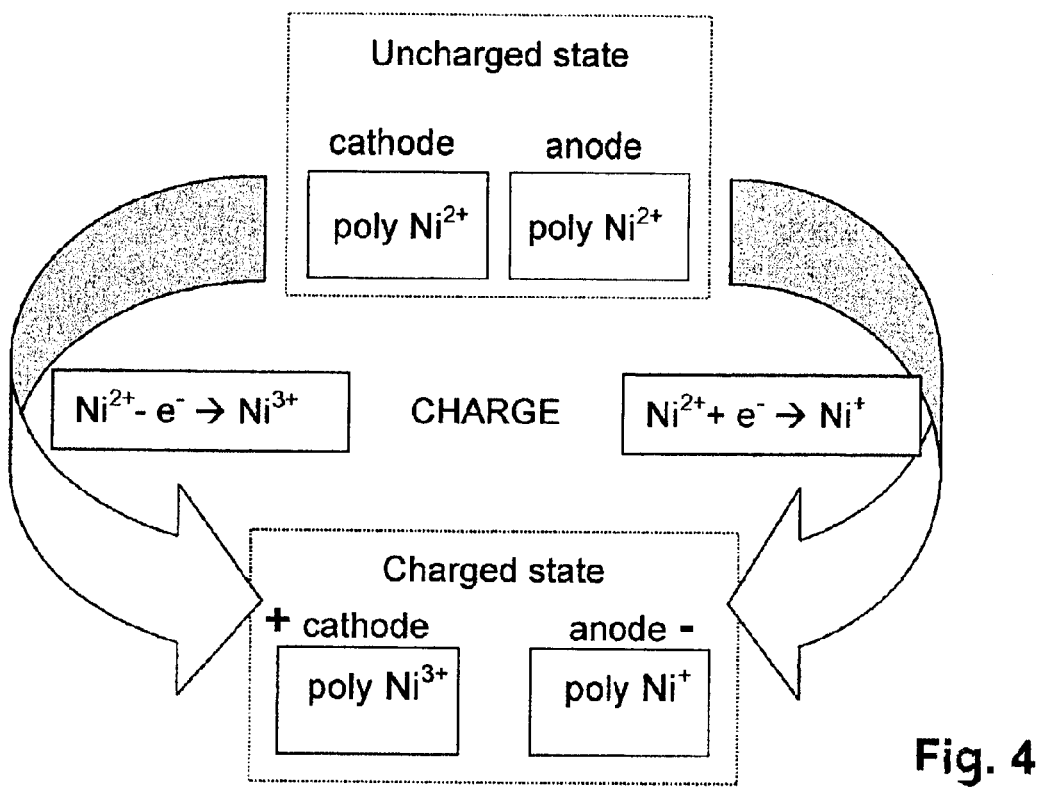
FIG. 4 is a schematic representation of a charging process for a supercapacitor of FIG. 1.

The functioning of the electrochemical supercapacitor of FIG. 1 equipped with the electrodes of FIGS. 3 and 5 described above is demonstrated by the schematic shown in FIG. 4.

When the electrochemical supercapacitor operates in the discharging mode, the processes of oxidation and reduction of polymer complex proceed in the opposite direction, as shown.

As has been shown, here are three types of electrochemical supercapacitors.

Type I: both electrodes are the same (i.e. one and the same polymer is applied onto their substrates—e.g. poly-[Ni(CH$_3$O-Salen)]). When in a completely charged state, one electrode is oxidized completely (Ni$^{3+}$), while the other electrode is in the uncharged (neutral) state (Ni$^{2+}$).

Type II: two different electrodes (i.e. different polymers are applied onto their surfaces—e.g. poly-[Ni(CH$_3$O-Salen)] is applied onto the surface of the negative electrode (anode), and poly-[Pd(CH$_3$O-Salen)] is applied onto the surface of the positive electrode (cathode).

Type III: an oxidized form of a polymer is applied onto one electrode and the reduced form of the same polymer is applied onto the other electrode—e.g. poly-[Ni(CH$_3$O-Salen). When in a completely charged state, one electrode is oxidized completely (Ni$^{3+}$), while the other electrode is reduced completely (Ni$^+$).

When varying the transition metal and type of polymer, the electromotive force (EMF) of the electrochemical capacitor of Type III may go as high as 3 V and specific energy capacity—over 300 J/g of polymer weight.

Another exemplary embodiment of a supercapacitor according to the present invention will now be described. A cyclic chrono-volt-amperegram of redox processes with the participation of complex poly-[Ni(CH$_3$O-Salen) is shown in FIG. 5 for platinum electrode, the area of which is 0.3 cm$^2$. In order to record said volt-amperegram, the electrode with polymer film was put into a cell with a background electrolyte, 0.1M solution of tetrabutylammonium perchlorate in acetonitrile at a rate of potential variation—Vs=10 mV/s. It can be seen in the chrono-volt-amperegram that there are two areas of redox activity of the polymer—at positive potentials (poly-Ni$^{II}$⇌poly-Ni$^{III}$) and at negative potentials (poly-Ni$^{II}$⇌poly-Ni$^{I}$). The standard potentials corresponding to the two types of redox processes are respectively +1 V and −1.75 V, respectively, shown on the axis of potentials. Thus, the electromotive force (EMF) of the electrochemical capacitor is 2.75 V.

The specifc energy capacity of the system (reduced to polymer weight) is equal to 260 J/g, which is significantly higher than the value mentioned above (140 J/g), indicated by Conway (supra) as the maximum value for electrochemical supercapacitors (see the Table).

Although the exemplary embodiment of the present invention is depicted herein as a supercapacitor, it will be understood that implementation and application of the present invention is not so limited and can include other devices within which energy or charge storage electrodes form part of an combination of interactive elements. Also, other and further modifications and improvements can be made to the presently disclosed embodiments without departing from the spirit and scope of the present invention.

What is claimed is:

1. An energy storage device that includes at least two electrodes, at least one of said electrodes comprising an electrically conducting substrate, a layer of energy accumulating redox polymer on said substrate, said redox polymer including a polymer complex compound of transition metal having at least two different degrees of oxidation, said polymer complex compound being formed of stacked transition metal complex monomers.

2. The device according to claim 1, wherein said polymer complex compound of transition metal comprises stacked transition metal complex monomers having planar structure with the deviation from the plane of no greater than 0.1 nm and having a branched system of conjugated π-bonds.

3. The device according to claim 2, wherein said polymer complex compound of transition metal comprises a polymer metal complex with substituted tetra-dentate Schiff's base.

4. The device according to claim 3, wherein a compound from a group poly-[Me(R, R'-Salen)] is employed as said polymer metal complex with substituted tetra-dentate Schiff's base; where Me—transition metal, Salen—residue of bis-(salicylaldehyde)-ethylenediamine in Schiff's base, R=H or electron-donating substituent, for example CH3O—, C2H5—, HO— or —CH3, R'=H or Hlg; and said compound has the following graphical formula

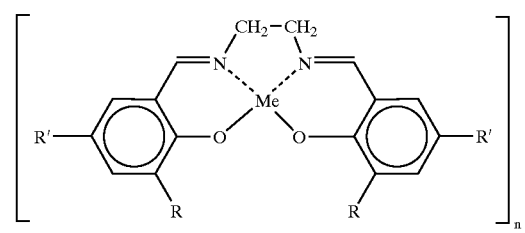

where n=2–200000.

5. The device according to claim 3, wherein a compound from a group poly-[Me(R, R'-Saltmen)] is employed as said polymer metal complex with substituted tetra-dentate Schiff's base; where Me—transition metal, Saltmen—residue of bis-(salicylaldehyde)-tetramethylethylenediamine in Schiff's base, R=H or electron-donating substituent, for example CH3O—, C2H5O—, HO— or —CH3, R'=H or Hlg; and this compound has the following graphical formula

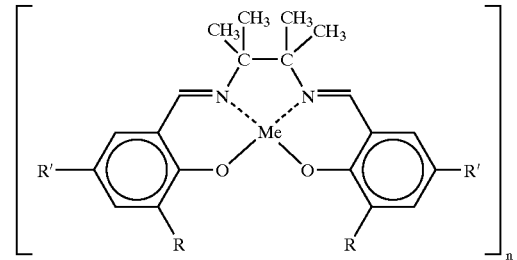

where n=2–200000.

6. The device according to claim 3, wherein a compound from a group poly-[Me(R, R'-Salphen)] is employed as said polymer metal complex with substituted tetra-dentate Schiff's base; where Me—transition metal, Salphen—residue of bis-(salicylaldehyde)-o-phenylenediamine in Schiff's base, R=H or electron-donating substituent, for example $CH_3O-$, $C_2H_5O-$, HO— or —$CH_3$, R'=H or Hlg; and said compound has the following graphical formula

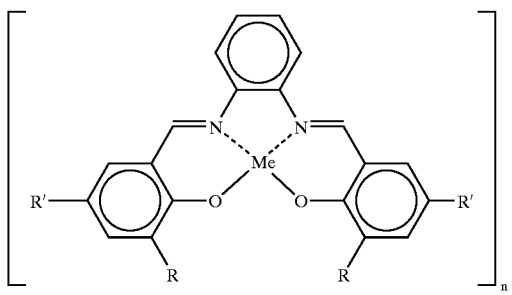

where n=2–200000.

7. The device according to claim 1, wherein the thickness of said layer of energy-accumulating redox polymer is within the range 1 nm–20 μm.

8. The device according to claim 1, wherein a metal from the group Ni, Pd, Co, Cu, Fe is employed as transition metal in the said polymer complex compound.

9. The device according to claim 1, wherein said conducting substrate is made of carbon and has a flat or developed surface.

10. The device according to claim 1, wherein said conducting substrate is made of carbon and is uncoated or coated with metal.

11. The device according to claim 1, wherein said conducting substrate is made of metal and has a flat or developed surface.

12. The device according to claim 1, wherein said conducting substrate is made of electronically conducting polymer in the form of a film, porous structure or solid foam.

13. The device according to claim 1 wherein the device comprises an electrochemical capacitor or battery including, a casing, said one and the other of said electrodes located in said casing in spaced relation, and electrolyte filling the space between said electrodes.

14. The device according to claim 13 wherein the other of said two electrodes comprising an electrically conducting substrate and a layer of energy accumulating redox polymer on said substrate, said redox polymer including a polymer complex compound of transition metal having at least two different degrees of oxidation, said polymer complex coumpound formed of stacked transition metal complex monomers.

15. The device according to claim 13, wherein the electrolyte is electrochemically inactive at potentials from −3.0 to +1.5 V and the electrolyte includes ions, the diameter of each ion being no greater than 0.6 nm and which ions are in solution in an organic solvent to a concentration of no less than 0.01 mol/l.

16. The device according to claim 15, wherein ions of a salt of tetrabutylammonium, or tetramethylammonium, or tetraethylammonium from the group perchlorate, tetrafluoroborate, or hexaflurophosphate are used as said ions in the electrolyte.

17. The device according to claim 15, wherein said solvent is from the group: acetonitrile, dimethyl ketone, propylene carbonate is used as said organic solvent.

18. The device according to claim 13, further including a stabilizer included in the composition of said electrolyte.

19. The device according to claim 13, further including a thickener for transforming the electrolyte into the gel-like state.

20. The device according to claim 13, further including a separator that separates the space between the electrodes into the cathode space and anode space.

21. The device according to claim 13, wherein the casing of said capacitor is made of material that is resistant to the action of electrolyte.

22. The device according to claim 13, further including auxiliary components for pouring electrolyte, and for pressure relief located on the casing of said capacitor.

23. The device according to claim 13 wherein, the other of said two electrodes is formed of electrically conductive material.

* * * * *